United States Patent [19]

Dreisin

[11] Patent Number: 4,624,030
[45] Date of Patent: Nov. 25, 1986

[54] STUFFING MACHINE FOR FOOD PRODUCTS
[76] Inventor: Ilya Dreisin, 353 W. 57th St. #1257, New York, N.Y. 10019
[21] Appl. No.: 718,991
[22] Filed: Apr. 1, 1985
[51] Int. Cl.⁴ .............................................. A22C 11/10
[52] U.S. Cl. ............................................ 17/33; 17/34; 17/49
[58] Field of Search ................. 17/33, 34, 1 F, 41, 17/42, 49

[56] References Cited
U.S. PATENT DOCUMENTS
723,072  3/1903  Thom ................................... 17/42 X
3,060,495 10/1962  Müller .................................... 17/33
4,379,356  4/1983  Geissbühler ........................ 17/1 F X Primary Examiner—Willie G. Abercrombie

[57] ABSTRACT

A stuffing machine has device for holding and stuffing a tubular casing of a food product with a filling material, and a supporting device for supporting stuffed downstream portion of the tubular casing with relative rotation of the devices to twist the tubular casing therebetween. The supporting device includes a swelling member with an inner space which can be filled with air to swell the member with resulting gentle embracing and supporting the stuffed portion by the member and be emptied of air for terminating the supporting and releasing the stuffed portion.

9 Claims, 4 Drawing Figures

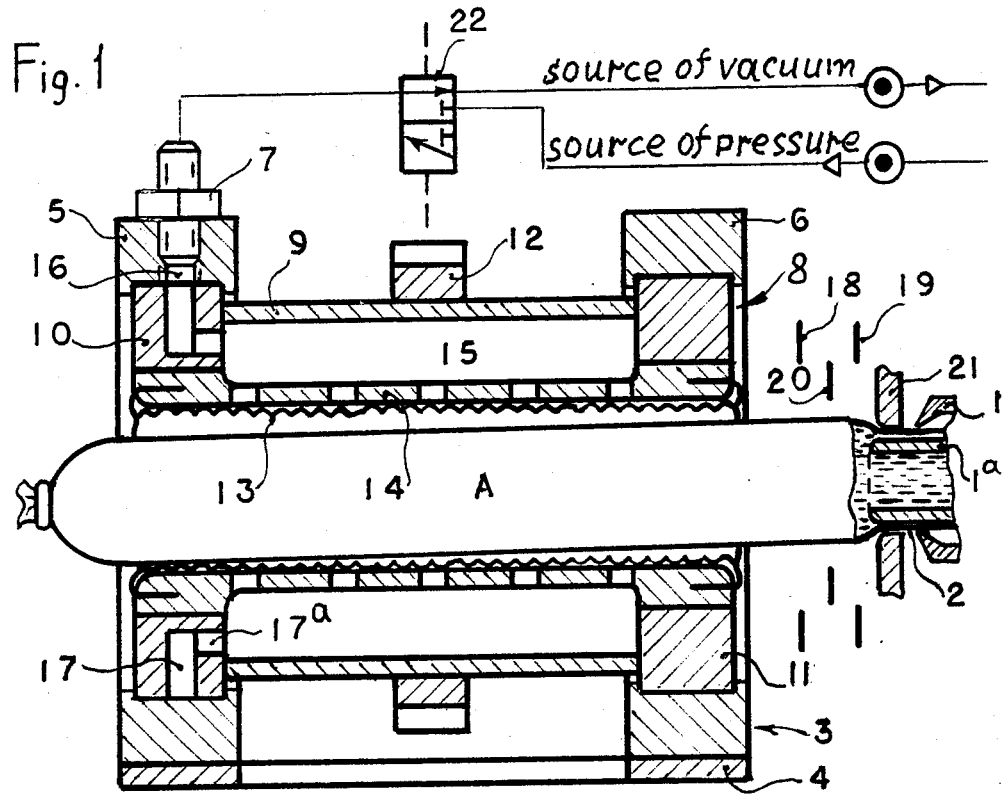
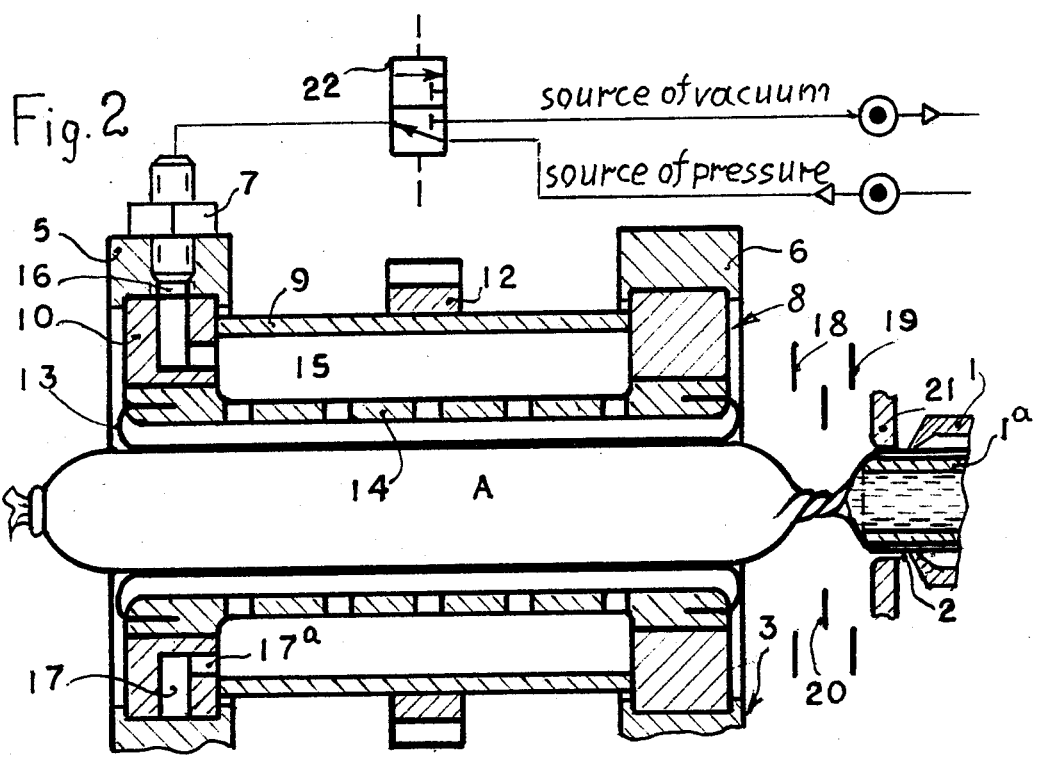

STUFFING MACHINE FOR FOOD PRODUCTS

BACKGROUND OF THE INVENTION

The present invention relates to a stuffing machine for food products and particularly for such a stuffing machine in which tubular casings are stuffed with filling products and the items are separated from each other.

Machines of the above-mentioned general type are known in the art. For filling a synthetic, semi-synthetic or natural tubular casing with a sausage mixture or another food product, one end of the casing is closed, the casing is placed on a filling tube of the machine, a filling mixture is forced under pressure through the filling tube into the casing, and after a predetermined length of the casing has been filled, the filled casing is tied-off or clip-closed to form an individual item.

Machines are known in which for making linked sausages, filled items are separated from one another by twisting-off the sausage casing, for example by rotating a non-filled portion of the tubular casing while simultaneously preventing the rotation of the filled portion thereof. Such machines are disclosed in the U.S. Pat. Nos. 4,112,546, 4,073,039, 4,021,885 and 3,964,128. Machines are also known in which for making sausages, the filled items are separated from each other by tied string pieces or by metallic clips which are mounted on the casing by introducing them radially over the constricted end portion of the casing and forcing them to clamp this portion. The machine has means for constricting the casing during the clip-closing operation as disclosed for example in the U.S. Pat. Nos. 4,438,545, 4,044,425, 4,044,426 and 3,748,690. In the known machines with clip-closing the casing material can be mechanically damaged. In the machines with twisting-off, the speed of operation is relatively low.

SUMMARY OF THE INVENTION

Accordingly, it is an object of the present invention to provide a stuffing machine for food products, which avoids the disadvantages of the prior art.

More particularly, it is an object of the present invention to provide a stuffing machine for food products which prevents damaging of a tubular casing of a food product during separation between individual items and allows forming of the food products with any casing of any diameter or length of the items, with high speed of operation.

In keeping with these objects and with others which will become apparent hereinafter, one feature of the present invention resides, briefly stated, in a stuffing machine having a device for holding an upstream portion of a tubular casing and a device for supporting a stuffed downstream portion of the tubular casing, one of said devices being turnable relative to the other so as to twist the tubular casing in the region between the devices, wherein the supporting device includes a swelling member having an inner space communicating with a source of air so that the air is entered into said inner space said swelling member swells and firmly embraces and supports the stuffed downstream portion of the tubular casing, while when the air is withdrawn from the inner space the swelling member releases the downstream portion.

When the machine is designed in accordance with the present invention, individual items of food products can be made with any diameter and length without damaging to the tubular casing and with high speed.

The advantage also is that the supporting device is turnable relative to the holding device, that can be made easier clip-closing the end of the item.

The invention will be best understood from the following description accompanied by the drawings.

BRIEF DESCRIPTION OF THE DRAWING

FIGS. 1 and 2 are views showing a longitudinal section of a part of a stuffing machine in accordance with the present invention, in two positions.

DESCRIPTION OF PREFERRED EMBODIMENTS

Figure 3:
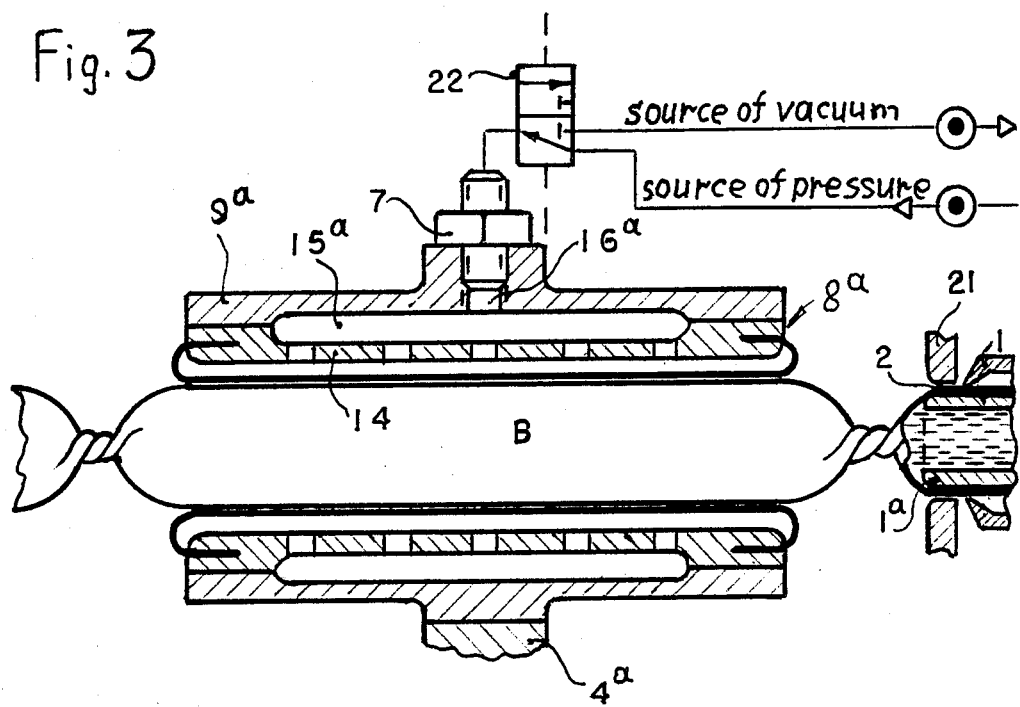
FIGS. 3 and 4 are views showing a longitudinal section and a transverse section of the inventive machine, in accordance with another embodiment of the present invention.

A stuffing machine in accordance with the present invention includes a holding device 1, only a part of which is shown at the right side of the drawings. The holding device 1 includes a stuffing tube identified with reference numeral 1a. A paste-like stuffing material is pressed through the stuffing tube into a deshirred portion of a tubular casing of a product to be made. The deshirred tubular casing, identified with reference numeral 2 is continuously supplied by the device 1 and drawn over the outer surface of the tube 1a and stuffed. When one item is completely filled, the flow of the stuffing material is stopped and the casing 2 is to be closed at the free end of the stuffing tube 1a to form an individual item. Supporting device is located downstream of the free end of the stuffing tube 1a.

The part of the machine shown in FIGS. 1 and 2 has a stator 3 secured to a removable body 4, includes a left split-bearing 5, a right split-bearing 6, a nipple 7. A multi-tubular rotor 8 includes an external tube 9 with left and right rings 10 and 11 and a driving element for example a gear 12, and an internal limitedly stretching tube 13 for example of plastic with both ends fixed to the end of a middle perforated tube 14.

The external tube 9 with the rings 10 and 11, the perforate tube 14 and the stretching tube 13 form together a swelling member with an inner space 15. An opening 16 and the nipple 7 serve for distributing the air into and out of the inner space 15. The ring 10 has an annular groove 17 and several openings 17a which permanently connect the openings 16 with the inner space 15. Reference numerals 18 and 19 identify schematically shown clip devices for closing the casing, for example a sausage casing, and reference numeral 20 identifies a cutting device. A known device formed as a ring 21 prevents backflow of the fluid mass in a direction opposite to the direction of movement of the filling. It is located adjacent to the free end of the stuffing tube 1. Finally, a pneumatic valve is provided between the sources of vacuum and pressure and the nipple 7.

The machine shown in FIGS. 1 and 2 operates in the following manner: The tubular casing 2 is drawn off the stuffing tube 1a by the fluid mass which is pressed out of the stuffing tube by means of the stuffing machine. When the item "A" has been filled, the flow of the mass is stopped, the valve 22 is switched to the upper position and simultaneously the gear 12 is driven in rotation by not shown means of the machine. The air from the source of the air pressure is supplied into the inner space 15.

The flexible tube stretches and firmly and gently embraces the items, while the gear 12 turns the rotor 8 with embraced item about its axis. Thereby the tubular casing is twisted at the free end of the stuffing tube 1a. When a predetermined number of revolutions of the item has been made, the rotor is stopped and the means 18,19 and 20 clip-close and cut the casing to separate the item. Instead of clip-closing, the casing can be tied off at the free end of the stuffing tube. Then the valve 22 is switched to the lower position, the air is withdrawn from the inner space 15, the flexible tube 13 is removed from the item "A" and attracted to the tube 14, and the item "A" is released. The fluid mass for the next item fills the tubular casing and pushes the separated preceding item out of the rotor 8.

Figure 4:
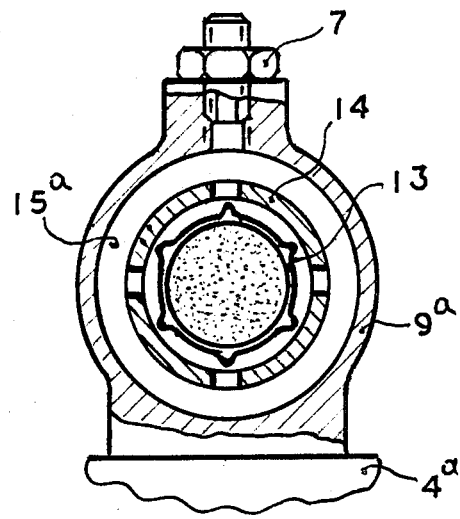

The machine in accordance with another embodiment is shown in FIGS. 3 and 4. It has a multi-tubular unit 8a secured to a removable body 4a, includes an external tube 9a, the middle perforate tube 14, the flexible limitedly stretchable tube 13. The external tube 9a, the perforate tube 14 and the stretching tube 13 together form a swelling member with an inner space 15a. The nipple 7 and an opening 16a serve as a distributing means for feeding the air into and out of the inner space 15a. A known device formed as a ring 21 prevents backflow of the fluid mass. The valve 22 is also arranged between the sources of vacuum and pressure and the nipple 7.

In the machine shown in FIGS. 3 and 4, when an item "B" has been filled, the valve 22 is switched to the position in which it is shown in FIG. 3. The air flows from the source of air pressure into the inner space 15a, the stretching tube 13 firmly and gently embraces the item and prevents its rotation about the longitudinal axis, while the tubular casing which is still on the stuffing tube 1a rotates by holding means 1 relative to the item. Thereby the tubular casing is twisted off at the free end of the stuffing tube. Then the rotation of the tubular casing is stopped after a predetermined number of revolutions. Simultaneously the valve 22 is switched to its lower position, the air is withdrawn from the inner space 15a, the stetching tube 13 is removed from the item "B" and attracted to the perforate tube 14, and the item is released. The fluid mass for a next item fills the casing and pushes the preceding item out of the unit 8a. The valve 22 is controlled by a means of the stuffing machine, which is not shown in the drawing.

It is possible, for placing a new portion of the empty casing on the stuffing tube 1a, to move the removable bodies 4 and 4a with all units.

The invention is not limited to the details shown since various modifications and structural changes are possible without departing from the spirit of the present invention.

What is desired to be protected by Letters Patent is set forth in particular in the appended claims.

I claim:

1. A stuffing machine for food products, comprising holding means for holding and continuously supplying an upstream portion of a tubular casing which includes a stuffing tube for stuffing the tubular casing with stuffing material and
supporting means located downstream of said holding means and arranged for supporting a stuffed downstream portion of the tubular casing and turning that portion so as to twist the tubular casing in the region between said two means, wherein said supporting means includes a stator and a multitubular rotor, turnable relative to said holding means, said rotor has a swelling member with an inner space, which is formed by an external part with air communicating means, an annular stretching part for radially surrounding downstream filled portion of the tubular casing and a perforate part located between said external part with communicating means and said stretching part.

2. A stuffing machine as defined in claim 1, wherein said rotor has a driving member arranged to turn said rotor together with said stretching part, said stator has means for clutching said rotor and distributing means for feeding the air into and out of said inner space via said communicating means, said distributing means is constant communicatable with said inner space.

3. A stuffing machine as defined in claim 1 or 2 comprising switchable valve means for connecting the sources of air pressure and vacuum with said inner space, said valve means is switchable between a first position in which said valve means supply air into said inner space via said distributing means and said communicating means and a second position in which the air is withdrawn from said inner space via said distributing means and said communicating means.

4. A stuffing machine as defined in claim 1, wherein said stretching part is formed as an annular part, with both ends fixed to the ends of said perforate part for radially surrounding the downstream filled portion of the tubular casing, and arranged so that when the air is entered to said inner space said stretching part firmly embraces and supports the downstream portion of the tubular casing and when the air is withdrawn from said inner space said stretching part is attracted to said perforate part and releases the filled item.

5. A stuffing machine of claim 2, wherein said stator is secured to a removable body.

6. A stuffing machine for food products, comprising holding means for holding and continuously supplying an upstream portion of tubular casing which includes a stuffing tube for stuffing the tubular casing with stuffing material, supporting means located downstream of said holding means and arranged for supporting a stuffed downstream portion of the tubular casing, said holding means being turnable relative to said supporting means so as to twist the tubular casing in the region between said two means, said supporting means has a swelling member with an inner space, wherein said swelling member is formed by an external part having air distributing means, an annular stretching part for radially surrounding the downstream filled portion of the casing and a perforate part located between said external part and said stretching part.

7. A stuffing machine of claim 6, wherein said stretching part is formed as an annular part with both ends fixed to the ends of said perforate part for radially surrounding the downstream filled portion of the tubular casing and arranged so that when the air is entered to said inner space said stretching part firmly embraces and supports the downstream filled portion of the tubular casing and when the air is withrawn from said inner space said stretching part is attracted to said perforate part and releases the filled item.

8. A stuffing machine of claim 6 comprising switchable valve means for connecting the sources of air pressure and vacuum with said inner space, said valve means is switchable between a first position in which said valve means supply air into said inner space via said distributing means and a second position in which the air is withdrawn from said inner space via said distributing means.

9. A stuffing machine of claim 6, wherein said external part is secured to a removable body.

* * * * *